US011140909B2

(12) United States Patent
 Keller

(10) Patent No.: US 11,140,909 B2
(45) Date of Patent: Oct. 12, 2021

(54) DRYER FOR LACTOSE AND HIGH LACTOSE PRODUCTS

(71) Applicant: Keller Technologies, Inc., Marshfield, WI (US)

(72) Inventor: A. Kent Keller, Mantorville, MN (US)

(73) Assignee: Keller Technologies, Inc., Marshfield, WI (US)

( * ) Notice: Subject to any disclaimer, the term of this patent is extended or adjusted under 35 U.S.C. 154(b) by 446 days.

(21) Appl. No.: 16/062,993

(22) PCT Filed: Dec. 8, 2016

(86) PCT No.: PCT/US2016/065628
 § 371 (c)(1),
 (2) Date: Jun. 15, 2018

(87) PCT Pub. No.: WO2017/106008
 PCT Pub. Date: Jun. 22, 2017

(65) Prior Publication Data
 US 2019/0000099 A1   Jan. 3, 2019

Related U.S. Application Data

(60) Provisional application No. 62/267,838, filed on Dec. 15, 2015.

(51) Int. Cl.
 *F26B 19/00* (2006.01)
 *A23C 1/05* (2006.01)
 (Continued)

(52) U.S. Cl.
 CPC ................. *A23C 1/05* (2013.01); *A23C 1/00* (2013.01); *A23C 1/04* (2013.01); *A23C 21/00* (2013.01);
 (Continued)

(58) Field of Classification Search
 CPC .... A23C 1/05; A23C 1/00; A23C 1/04; A23C 1/12; F26B 11/026; F26B 1/005; F26B 3/08; C13K 5/00
 (Continued)

(56) References Cited

U.S. PATENT DOCUMENTS 4,492,040 A * 1/1985 Jensen ................... F26B 3/084
 34/367
5,006,204 A * 4/1991 Jensen ..................... A23C 1/04
 159/3
(Continued)

FOREIGN PATENT DOCUMENTS

| AU | 201225994 B2 | 11/2012 |
| WO | 9735486 | 10/1997 |
| WO | 2015027101 A1 | 2/2015 |

OTHER PUBLICATIONS

International Search Report and Written Opinion of counterpart international application PCT/US2016/065628, dated Mar. 14, 2017, 15 pgs.
(Continued)

*Primary Examiner* — John P McCormack
(74) *Attorney, Agent, or Firm* — Shumaker & Sieffert, P.A.

(57) ABSTRACT

A system for drying a wet lactose product stream includes a disperser configured to disperse agglomerated lactose particulates in a wet lactose stream into a dispersed wet lactose stream. A back-mixed partial drying zone is configured to at least partially dry the dispersed wet lactose stream by
(Continued)

recirculating a partially dried lactose stream with the dispersed wet lactose stream. A plug-flow secondary drying zone is configured to dry the partially dried lactose stream to generate a substantially dried lactose stream.

10 Claims, 2 Drawing Sheets

(51) Int. Cl.
      *A23C 21/00*     (2006.01)
      *C13K 5/00*     (2006.01)
      *F26B 1/00*     (2006.01)
      *F26B 3/08*     (2006.01)
      *A23C 1/00*     (2006.01)
      *A23C 1/04*     (2006.01)
      *F26B 11/02*     (2006.01)
      *A23C 1/12*     (2006.01)

(52) U.S. Cl.
      CPC ............... *C13K 5/00* (2013.01); *F26B 1/005* (2013.01); *F26B 3/08* (2013.01); *F26B 11/026* (2013.01); *A23C 1/12* (2013.01)

(58) Field of Classification Search
      USPC .............................. 34/62, 329, 332, 358, 356
      See application file for complete search history.

(56) References Cited

U.S. PATENT DOCUMENTS

| | | | | |
|---|---|---|---|---|
| 6,391,361 | B1* | 5/2002 | Peters | A23C 1/12 |
| | | | | 426/471 |
| 2003/0200672 | A1* | 10/2003 | Keller | C13B 30/028 |
| | | | | 34/372 |
| 2016/0340750 | A1* | 11/2016 | Scholz | C13K 5/00 |

OTHER PUBLICATIONS

Pisecky, "Spray drying in the cheese industry", International Dairy Journal 15 (2005) 531-536, Jun. 1, 2005, 6 pgs.
First Examination Report from counterpart Australian Patent Application No. 2016370303, dated Apr. 2, 2019, 3 pp.
Response to Communication Pursuant to Rules 161(1) and 162 EPC dated Jan. 17, 2019 from counterpart European Application No. 16822562.1, 14 pp.
First Examination Report from counterpart New Zealand Application No. 744161, dated Dec. 6, 2018, 5 pp.
Response to First Examination Report from counterpart New Zealand Application No. 744161, dated Apr. 1, 2019, 7 pp.
International Preliminary Report on Patentability from International Application No. PCT/US2016/065628, dated Jun. 19, 2018, 7 pp.

\* cited by examiner

DRYER FOR LACTOSE AND HIGH LACTOSE PRODUCTS

BACKGROUND

The milk sugar lactose is typically produced by concentrating cheese whey or de-proteinized cheese whey, cooling the concentrate to force crystallization of the lactose contained in the whey, separating the crystals from the balance of the whey constituents, purifying the crystals through washing with water, and drying the washed crystals.

Systems for drying lactose include drum dryers, attrition/separation dryers, fluid bed dryers, vibrating fluid bed dryers, and combinations thereof. Wet lactose fed to any of these dryers is typically discharged from a solid bowl decanter or a continuous screening centrifuge. When discharged, the wet lactose may be packed into fairly cohesive clumps. If these clumps are not de-agglomerated, the lactose will dry into large, hard chunks that are difficult to handle or further process as compared to, for example, a fine, free-flowing powder.

Historically, lactose was industrially dried in drum dryers using co-current or counter-current air flow. Due to relatively cool air leaving the dryer, counter-current drum dryers may present problems such as mold growth at the product inlet end of the dryer, in the air outlet ductwork, and in the final air cleaning device (cyclone and/or baghouse). The co-current version of a drum dryer has a relatively high inlet temperature that may cause product scorching, and low outlet temperatures that do not produce a shelf stable product. Furthermore, rotary seals, an inherent feature of rotary drum dryers, typically allow unfiltered air into both versions of the drum dryer.

An attrition/separation drying system reduces wet lactose agglomeration with a rotating rake that de-agglomerates the wet lactose agglomerates, as well as an air stream that removes properly dispersed lactose from the drying chamber. Lactose that is not properly dispersed is recycled within the dryer until the lactose is properly de-agglomerated. U.S. Pat. No. 4,379,368 describes a hot air drier system for breaking up and drying particles or aggregates of moist material that includes a preliminary drier unit with a moist solids inlet, a hot air inlet, and a dried solids outlet. A pneumatic conveying conduit receives solids from the outlet and subjects them to further drying while they are conveyed to a suitable separator. Hot air is supplied to the drier inlet through a supply conduit which has a bypass conduit for delivering fully heated air to the pneumatic conveying conduit close to the solids outlet and which also has a cooling air conduit or bypass for selectively feeding heated air of somewhat lower temperature to the drier inlet. Retention times within this type of dryer can be too short to produce a shelf stable product. Therefore, a cyclone unit may be required to separate the partially dried lactose from the drying/classifying air and to route the partially dried product to a second stage fluid bed dryer for final drying.

Static fluid bed lactose dryers typically incorporate a rotating rake or agitator to disperse wet, agglomerated lactose into the already partially dried lactose within a drying zone. The disadvantages of this type of dryer include adhesion of wet product to the rake, scorching of the product adhering to the rake followed by combining of scorched product with clean product. Furthermore, the centrifugal force generated by the rotating rake causes build-up of product on the perimeter of the agitated area again causing scorch problems, incomplete dispersion of agglomerated lactose, and results in wet or scorched product being discharged from the dryer.

Vibrating fluid bed dryers have been used to facilitate movement of agglomerated lactose through the drying zone of a fluid bed dryer. However, larger agglomerates tend to be under-dried and must be separated from the rest of the product. To overcome this problem, an attrition/separation dryer may need to be added as a pre-dryer upstream of the vibrating fluid bed dryer.

SUMMARY

The present disclosure describes a compact, efficient dryer that overcomes the problems inherent in dryers traditionally used for the industrial drying of lactose.

In one aspect, the present disclosure is directed to a system including a disperser configured to disperse agglomerated lactose particulates in a wet lactose stream into a dispersed wet lactose stream; a back-mixed partial drying zone configured to at least partially dry the dispersed wet lactose stream by recirculating a partially dried lactose stream with the dispersed wet lactose stream; and a plug-flow secondary drying zone configured to dry the partially dried lactose stream to generate a substantially dried lactose stream.

In another aspect, the present disclosure is directed to a method including dispersing a wet lactose stream into a dispersed wet lactose stream; introducing the dispersed wet lactose stream in a back-mixed partial drying zone, wherein the back-mixed partial drying zone comprises a partially dried lactose stream that recirculates with the dispersed wet lactose stream; and introducing the partially dried lactose stream in a plug-flow secondary drying zone to generate a substantially dried lactose stream.

In yet another embodiment, the present disclosure is directed to a method including concentrating a wet lactose stream in one or more evaporators to form a concentrated wet lactose stream; crystallizing at least a portion of the lactose in the concentrated wet lactose stream in a crystallization cascade comprising one or more crystallizing stages to form an at least partially crystallized wet lactose stream; and drying the at least partially crystallized wet lactose composition to form a substantially dried lactose product, wherein the drying comprises dispersing the at least partially crystallized wet lactose stream into a dispersed wet lactose stream; introducing the dispersed wet lactose stream in a back-mixed partial drying zone, wherein the back-mixed partial drying zone comprises a partially dried lactose stream that recirculates with the dispersed wet lactose stream; and introducing the partially dried lactose stream in a plug-flow secondary drying zone to generate a substantially dried lactose stream.

In some embodiments, the lactose dryers and methods described below may prevent or reduce the occurrence of large, hard agglomerates in a final lactose product. Further, in some embodiments the lactose dryers according to this disclosure may reduce the mechanical complexity associated with operating a rotating rake within a drying zone and close to a hot, perforated air inlet plate of a dryer. In some embodiments, the lactose dryers described in this disclosure have one or more zones that operate at a lower temperature than conventional dryers, thereby improving energy efficiency. Further, in some embodiments the lactose dryers described in this disclosure promote more complete drying by routing product from the first, low temperature back-mixed drying zone through a second, higher temperature plug-flow drying zone, which can improve the shelf stability of the final product.

The details of one or more aspects of the invention are set forth in the accompanying drawings and the description below. Other features, objects, and advantages of the invention will be apparent from the description and drawings, and from the claims.

BRIEF DESCRIPTION OF DRAWINGS

The foregoing and other aspects of this invention are made more evident in the following Detailed Description, when read in conjunction with the attached Drawing Figures.

It should be understood that the Figures present non-exclusive examples of the techniques disclosed herein.

DETAILED DESCRIPTION

Lactose drying systems according to the present disclosure include a disperser and a static fluid bed dryer, which in some embodiments may reduce costs and improve lactose quality by drying the lactose in a primary back-mixed drying zone followed by a secondary plug-flow drying zone. The multi-zone, static fluid bed dryer combines primary and secondary dryers into a relatively compact form compared to conventional arrangements, and in some embodiments does not require multiple drying systems.

Figure 1:
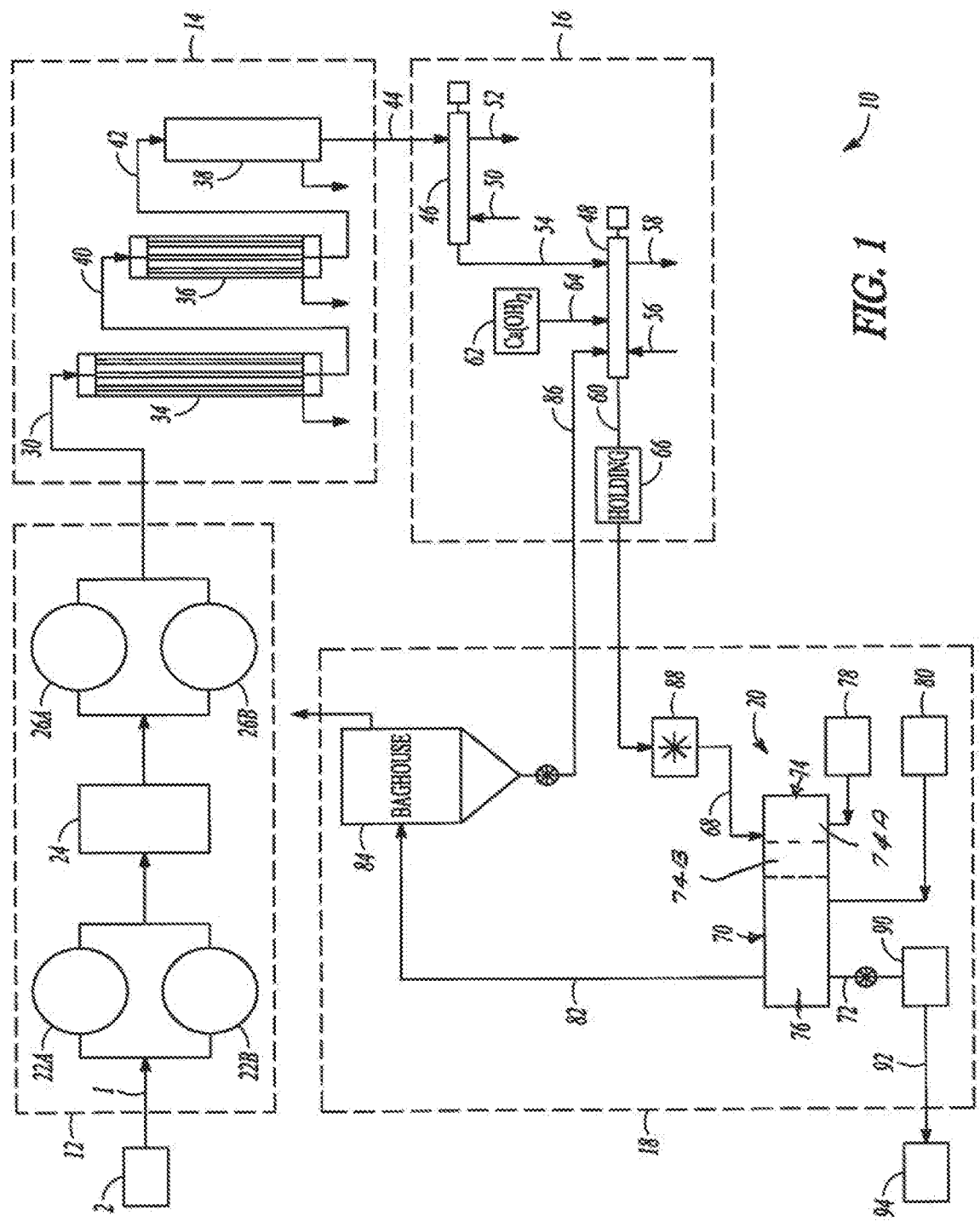
FIG. 1 is a schematic flow diagram illustrating an embodiment of a system for processing and drying lactose.

FIG. 1 is a schematic diagram illustrating an embodiment of a system for drying lactose. The example system 10 can include a wet lactose feed system 12 configured to receive a wet lactose stream 1 and transfer it to the rest of the system 10, a concentration system 14 for concentrating the wet lactose stream 1, such as via reverse osmosis, or evaporation, or both, a crystallization system 16, and a drying system 18.

In some examples, which are not intended to be limiting, the wet lactose stream 1 may include whey, de-proteinized whey, lactose-containing byproduct of dairy processing, or combinations thereof. A less pure form of lactose can be produced by concentrating de-proteinized whey. After crystallization of the lactose in high-solids de-proteinized whey, high-solids de-proteinized whey may be processed and dried in one or more of the drying systems described herein. For the sake of clarity, each of the lactose products described above will be simply referred to as "lactose" in the disclosure below.

In some embodiments, the wet lactose stream 1 may include, consist essentially of, or consist of, lactose and water. The lactose stream should preferably contain sufficient lactose monohydrate to serve as a carrier for the other, more hygroscopic, constituents. In some embodiments, the wet lactose stream 1 should contain greater than 60% lactose monohydrate to effectively dry in the disclosed system. In some embodiments, hygroscopic constituents of a less than pure wet lactose stream 1 are glucose, galactose, lactic acid, amino acids, non-protein nitrogenous products and inorganic salts.

The wet lactose feed system 12 can receive the wet lactose stream 1 from a whey composition supply 2. The wet lactose feed system 12 can include various pre-conditioning stages, such as one or more receiving tanks 22A, 22B, a pasteurizer 24, and one or more concentration feed tanks 26A, 26B. Operation of holding tanks and pasteurizers are well known in the dairy processing industry. The wet lactose feed system 12 can feed the pre-conditioned wet lactose stream into a concentration feed line 30 that can feed into the concentration system 14.

The concentration system 14 can include one or more unit operations configured to concentrate the wet lactose stream in the concentration feed line 30. The terms "concentrate," "concentrating," or "concentration," as used herein, can refer to increasing the total solids content of the wet lactose stream, such as by removing water from the wet lactose stream 30 to produce a concentrated wet lactose stream.

Removal of water from the wet lactose stream 30 to concentrate the wet lactose stream 30 in the concentration system 14 can be accomplished via one or more reverse osmosis devices or one or more evaporators, or both, such as a plurality of evaporators connected in series. In the example shown in FIG. 1, the concentration system 14 includes a first evaporator 34, a second evaporator 36, and a third evaporator 38. The evaporators 34, 36, 38 are connected in series, with an output from the first evaporator 34 (e.g., a first intermediate concentrated wet lactose stream 40) being fed into the second evaporator 36, and an output from the second evaporator 36 (e.g., a second intermediate concentrated wet lactose stream 42) being fed into the third evaporator 38. The output of the series of one or more evaporators 34, 36, 38 is a concentrated wet lactose stream such as a concentrated wet lactose stream 44 that can be fed into the crystallization system 16.

In an example, the first and second evaporators 34, 36 can be vacuum evaporators, such as falling film vacuum evaporators such as those typically used in the dairy industry. However, other types of water removal equipment can be used without varying from the scope of the present invention. As described above, the wet lactose stream 30 fed to the first evaporator 34 can be less than or equal to about 11 wt. % total solids (TS), such as about 6 wt. % TS. The evaporator 34 can concentrate the wet lactose stream 30 by evaporating water therefrom to form the first intermediate concentrated wet lactose stream 40. In an example, the first intermediate concentrated wet lactose stream 40 can have a total solids concentration of at least about 40 wt. % TS and as much as at least about 70 wt. % TS, for example about 60 wt. % TS. Because of this relatively low total solids concentration, the first evaporator 34 can be referred to as a low-concentration evaporator 34.

The first intermediate concentrated wet lactose stream 40 is fed into the second evaporator 36. The second evaporator 36 can concentrate the first intermediate concentrated wet lactose stream 40 by evaporating water therefrom, to form the second intermediate wet lactose stream 42. In an example, the second intermediate concentrated wet lactose stream 42 can have a total solids concentration of at least about 65 wt. % TS, such as at least about 80 wt. % TS, for example about 75 wt. % TS. Because of the increased solids concentration in the second intermediate concentrated wet lactose stream 42, the second evaporator 36 can be referred to as the high-concentration evaporator 36.

The second intermediate concentrated wet lactose stream 42 is fed into the third evaporator 38, where the third evaporator 38 evaporates additional water from the second intermediate concentrated wet lactose stream 42 to form the concentrated wet lactose stream 44 that can be fed into the crystallization system 16. In an example, the concentrated wet lactose stream 44 can have a total solids concentration of at least about 70 wt. % TS, such as at least about 75 wt.

% TS, for example at least about 80 wt. % TS, for example at least about 85 wt. % TS, for example about 87 wt. % TS, or even as much as 92 wt. % TS.

The third evaporator 38 can concentrate the wet lactose stream therein to such a degree that the solution has a very high viscosity that renders it difficult if not impossible to provide further concentration of the wet lactose stream above about 70 wt % to 75 wt %, particularly within a falling film evaporator, which is a typical evaporator used for concentration.

Despite this difficulty in concentrating the wet lactose stream above a certain total solids content due to the high viscosity of the concentrated lactose, it can be desirable to maximize the concentration that can occur in the concentration system 14 because evaporators, such as evaporators 34, 36, 38, can be more energy efficient than other concentration equipment, and in particular is substantially more energy efficient than air dryers.

To counteract the higher viscosity of the wet lactose, the third evaporator 38 can include an apparatus configured to agitate the higher-viscosity wet lactose stream within the third evaporator 38, such as with a rotor or with a high shear rate generated by pumping. For example, the third evaporator 38 can include an internal mechanism within the third evaporator 38 that can agitate the liquid within the third evaporator 38. The internal mechanism can therefore maintain a high degree of turbulence in the liquid portion of the wet lactose stream within the third evaporator 38. For this reason, the third evaporator 38 can be referred to as a swept-surface evaporator 38 (also referred to as a scraped-surface evaporator, a wiped-surface evaporator, or similar language).

The swept-surface evaporator 38 can include one or more blades or scrapers that are position adjacent to or in contact with the inner surface or surfaces of the swept-surface evaporator 38 that are to be cleared. The one or more blades or scrapers can be attached to a moving shaft, frame, or other mechanism that will move the one or more blades or scrapers across or along the interior surface or surfaces of the swept-surface evaporator 38. The blades or scrapers can agitate the liquid within the swept-surface evaporator 38, for example to create turbulent mixing of the high-viscosity wet lactose stream, to maximize heat transfer efficiency and to prevent deposition of solids on the heat transfer surface of the swept-surface evaporator 38.

An evaporator or evaporation system other than a swept-surface evaporator can be used to provide for the final stage of concentration of the wet lactose stream so long as the evaporator or evaporation system is configured to handle and concentrate high-viscosity liquids having a total solids content of at least 75 wt. %, and in particular at least about 85 wt. %. An example of another evaporator that can be used for the final stage of evaporation is a forced-circulation evaporator such as a forced circulation plate evaporator.

After concentration in concentration system 14, the resulting concentrated wet lactose stream 44 can have a total solids content of at least about at least about 70 wt. % TS, such as at least about 75 wt. % TS, for example at least about 80 wt. % TS, for example at least about 85 wt. % TS, for example about 87 wt. % TS, or even as much as 92 wt. % TS, as noted above. The concentration system 14 can be configured to allow the total solids content of the concentrated wet lactose stream coming out of the concentration system 14, e.g., the concentrated wet lactose stream 44, to be as high as is practical while still providing for a flowable or easily transportable concentrated wet lactose stream and to provide sufficient water in the concentrated wet lactose stream 44 to permit the formation of α-lactose monohydrate from the lactose present in concentrated wet lactose stream 44. The use of a swept-surface or forced-circulation type of evaporator as the last evaporator 38 in the series of evaporators of the concentration system 14 can provide for maximized total solids while preventing or reducing burning or other degradation of the lactose and other components of the wet lactose stream on the heating surface.

The crystallization system 16 can receive the concentrated wet lactose stream 44 from the concentration system 14 and can modify the concentrated wet lactose stream 44 to perform one or more steps of cooling the wet lactose stream 44 and crystallizing at least a portion of the lactose in the wet lactose stream 44, e.g., to form α-lactose monohydrate rather than amorphous lactose. The crystallization system 16 can include a crystallization cascade comprising one or more crystallizing stages that are configured to crystallize at least a portion of the lactose in the wet lactose stream 44.

In the example shown in FIG. 1, the crystallization system 16 can include one or more crystallization stages 46, 48 in the form of mixers 46, 48. The crystallization stages/mixers 46, 48 can be configured to mix and agitate the wet lactose stream in order to promote uniform crystallization of lactose to the α-lactose monohydrate form. As the crystallization of lactose to α-lactose monohydrate progresses in crystallization system 16, the composition of the wet lactose stream 44 can become thicker and more difficult to uniformly mix. In an example, each of the one or more mixers 46, 48 can be configured to mix highly viscous pastes or slurries, such as pug mill mixers.

Each mixer 46, 48 can be configured to cool the wet lactose stream, which, along with agitating the wet lactose stream, can promote crystallization of the lactose to the α-lactose monohydrate form. The crystallization of lactose to α-lactose monohydrate can generally be controlled by the temperature to which the lactose is cooled. In an example, the wet lactose stream can be cooled to a temperature of about 60° C. or less within the crystallization system 16, such as about 30° C. or less, for example about 10° C. or less.

To cool the wet lactose stream to the desired temperature, a cooling fluid can be fed to each mixer 46, 48 to cool the wet lactose stream to promote lactose crystallization. A first cooling fluid can be fed through the first mixer 46 via a cooling fluid inlet 50 and a cooling fluid outlet 52. The first cooling fluid can be configured (e.g., fluid composition, temperature, and flow rate) to cool the concentrated wet lactose stream 44 to a first temperature within the first mixer 46. By cooling the concentrated wet lactose stream 44 to the first temperature, a portion of the lactose can be crystallized to form an intermediate partially-crystallized wet lactose stream such as an intermediate partially-crystallized wet lactose stream 54, which can be fed into the second mixer 48. In an example, at least about 10 wt. % of the lactose in the intermediate partially-crystallized wet lactose stream 54 has been crystallized as α-lactose monohydrate, for example at least about 50 wt. %, such as about 70 wt. % of the lactose being crystallized as α-lactose monohydrate.

A second cooling fluid can be fed through the second mixer 48 via a cooling fluid inlet 56 and a cooling fluid outlet 58. The second cooling fluid can be configured (e.g., fluid composition, temperature, and flow rate) to cool the intermediate partially-crystallized wet lactose stream 54 to a second temperature within the second mixer 48. In an example, the second temperature is lower than the first temperature in the first mixer 46. By cooling the intermediate partially-crystallized wet lactose stream 54 to the second temperature, additional lactose can be crystallized to form an at least partially-crystallized wet lactose stream, such as an at least partially-crystallized wet lactose stream 60, wherein a higher percentage of the lactose in the crystallized wet lactose stream 60 has been crystallized to the α-lactose monohydrate form compared to the intermediate partially-crystallized wet lactose stream 54.

In an example, at least about 50 wt. % of the lactose in the crystallized wet lactose stream 60 has been crystallized as α-lactose monohydrate, for example at least about 80 wt. %, such as at least about 95 wt. %, and in some examples 100 wt. % of the lactose being crystallized as α-lactose monohydrate.

Other factors that can determine the degree of lactose crystallization to α-lactose monohydrate include, but are not limited to, the amount of time that the wet lactose stream is cooled within the mixers 46, 48 and the degree of mechanical mixing of the wet lactose stream in terms of the force of mixing and the uniformity of the wet lactose stream during mixing.

In an example, the first cooling fluid fed to the first mixer 46 can be cooling water at a first temperature, e.g., with an inlet temperature of about 30° C. The second cooling fluid fed into the second mixer 48 can be a cooling water at a second temperature, which can be lower than the first temperature of the first cooling fluid, e.g., with an inlet temperature of about 4° C.

Although FIG. 1 shows an example system 10 with two mixers 46, 48 as part of the crystallization system 16, the processes and the system of the present invention are not so limited. Rather, a system could include only one mixer, or could include three or more mixers, with varying configurations of cooling of the mixers to achieve the desired degree of crystallization. The number of stages/mixers in the crystallization system 16 can depend on the designed production rate of the overall system, wherein a larger production rate through the crystallization system 16 can lead to a higher number of mixers.

The presence of lactic acid in the wet lactose stream can make drying of the wet lactose stream difficult because of the hygroscopic nature of lactic acid. The lactic acid can also make the solid powder thermoplastic during drying, which can lead to further agglomeration and non-flowability of the powder. The system 10 can optionally be configured to counteract the effects of the lactic acid in the wet lactose stream being processed. A neutralizing compound 62 can be added to a wet lactose stream at one or more stages of the system 10 to neutralize at least a portion of the lactic acid therein. The neutralizing compound 62 can include a compound that can react with the lactic acid to form one or more reaction products that are less hygroscopic than lactic acid, less water soluble than lactic acid, or both, so that the resulting mixture of the one or more reaction products and at-least partially crystallized lactose is less hygroscopic, less water soluble, or both, than it would be if at least the portion of the lactic acid had not been neutralized. Examples of neutralizing compounds that can be used to neutralize lactic acid include, but are not limited to, at least one of hydroxides, carbonates, sulphates, phosphates, and polyphosphates and other similar products known to those of skill in the art. In an example, the neutralizing compound can include a salt of a multivalent metal and a hydroxide (e.g., calcium hydroxide ($Ca(OH)_2$) or magnesium hydroxide ($Mg(OH)_2$) or a salt of a multivalent metal and a carbonate (such as calcium carbonate ($CaCO_3$) or magnesium carbonate ($MgCO_3$).

It is known in the art that when the crystallization of the lactose has been started, e.g., in the mixers 46, 48, then the lactose can further crystallize simply by allowing the wet lactose composition to rest relatively undisturbed for a predetermined period of time, such as for from about 5 minutes to about 24 hours. Therefore, the crystallization system 16 can include a holding stage 66 downstream of the final stage of the crystallization cascade (e.g., the second mixer 48). The holding stage 66 can allow the lactose in the at least partially-crystallized wet lactose stream 60 to further crystallize. Examples of structures or devices that can form the holding stage 66 can include, but are not limited to, a holding area where the material is allowed to sit for the predetermined period of time, a conveyer belt with a cycle time equal to the predetermined holding time, or a rotating conveyer disc where the time that the at least partially-crystallized wet lactose stream 60 is on the disc is equal to the predetermined period of time. An at least partially crystallized wet lactose stream composition 68 exits the holding stage 66 and is fed into the drying and finishing system 18.

The drying and finishing system 18 includes a drying system 20 and additional equipment configured to further dry the at least partially crystallized wet lactose stream 68 and modify the liquid, slurry, paste or cake into a final form of a free-flowing powder.

The drying and finishing system 18 includes a chopper or other disperser 88 that can be configured to break up paste-like crystallized wet lactose coming out of the crystallization system 16 before it enters the dryer 70. In various embodiments, the disperser 14 utilizes blades, agitators, baffles, inline mixing elements, gratings, or other suitable static or moving structures to at least partially break up clumps of agglomerated lactose material and to generate a dispersed wet lactose stream. The chopper/disperser 88 substantially reduces or prevents agglomerated particles in the wet lactose stream from entering the downstream dryer, and helps to prevent hard agglomerated particles in the final lactose product.

In some embodiments, when leaving the chopper/disperser 88 the dispersed partially crystallized wet lactose stream includes a moisture content of about 5% to about 15% by weight. When removed from the chopper/88, the dispersed partially crystallized wet lactose stream may contain discrete lactose crystals or may contain small particles of about 200 µm to about 5,000 µm in size.

The drying system 20 is configured to dry the at least partially-crystallized wet lactose stream exiting the crystallization system 16 into a friable material. When drying high lactose products, a distinction must be made between the water of hydration associated with lactose monohydrate and the non-associated or free moisture. The objective of the present disclosure is to remove free moisture from the at least partially crystallized wet lactose stream without removing the lactose water of hydration. In some embodiments, for example, a high purity (99.8+% lactose monohydrate) wet lactose stream entering the drying and finishing system 18 is packed into fairly cohesive clumps. These clumps should be de-agglomerated to prevent the lactose from drying into large, hard chunks that complicate downstream drying and processing steps and result in a reduced quality dried lactose unacceptable to some customers.

The drying system 20 includes a fluidized bed dryer 70 configured to dry the dispersed partially crystallized wet lactose stream 68, e.g., to remove additional water so that a product 72 that exits the dryer 70 has a solids content of at least about 92 wt. % TS, such as at least about 94 wt. % TS, for example at least about 96 wt. % TS.

The fluidized bed dryer 70 can include a heating zone 74 and a cooling zone 76. The heating zone 74 of the dryer 70 includes two sub-zones, a primary back-mixed partial drying zone 74A and a secondary plug-flow drying zone 74B. The dispersed partially crystallized wet lactose stream 68 emerging from the chopper/disperser 88 is introduced into the back-mixed drying zone 74A, which further disperses agglomerated particles of lactose by continuously mixing the wet lactose input stream 68 with partially dried, fluidized lactose without agglomerating upon itself or upon the partially dried fluidized lactose.

The back-mixed partial drying zone 74A is maintained at a relatively low temperature; that is, at a temperature well below that required to produce a shelf stable product. The benefit of the low temperature is two-fold; 1) the overall energy efficiency of the drying system is improved by maximizing the difference between the inlet drying air and the air leaving a given area of the dryer, 2) the temperature of the partially dried product is maintained below its sticky point, that is the point at which the point tends to stick to dryer walls and to other particles.

In various embodiments, the inlet temperature in the back-mixed partial drying zone 74A is about 90° C. to about 160° C., or about 120° C. to about 145° C. When emerging from the back-mixed partial drying zone 16, the partially dried lactose stream may have a free moisture content of less than about 5% by weight, or about 3% or about 2% by weight, or about 1% or about 0.3% by weight.

In various embodiments, an outlet temperature of the back-mixed drying zone 74A is maintained at less than about 45° C. to about 90° C., or about 50° C. to about 60° C., to further dry the partially dried lactose stream.

The partially dried lactose stream is then introduced into a plug-flow secondary drying zone 74B. Plug flow within the secondary dryer is maintained either by utilizing a high length to width ratio in the zone or by using alternating baffles to effectively produce a high length to width ratio in the zone. The product temperature at the end of the plug flow zone 74B is sufficient to further dry the partially dried lactose stream to generate a substantially dried lactose stream.

In various embodiments, the temperature of the plug-flow secondary drying zone 74B is about 90° C. to about 120° C., or about 110° C. to about 120° C. The required final product temperature will depend on, for example, the hygroscopicity of the lactose stream and the propensity for the lactose stream to undergo browning (Maillard reaction).

In various embodiments, the substantially dried lactose stream that emerges from the plug-flow secondary drying zone 74B is in a shelf-stable form, and has a free moisture content of about 0.0% by weight or about 0.1% or about 0.2% by weight, or about 0.5% or about 1.0% by weight. The required final product moisture will depend on, for example, the hygroscopicity of the lactose stream and the shelf stable required of the final product.

In the embodiment shown in FIG. 1, the plug-flow secondary drying zone 74B and the back-mixed partial drying zone 74A are components of the same static fluid bed dryer 70, although in some embodiments the zones 74A, 74B may be separate static fluid bed dryers.

Once the lactose particles are sufficiently dried to a shelf-stable form, in some embodiments, the plug-flow secondary drying zone 74B may discharge into an optional fluidized bed cooling zone 76, which cools the substantially dried lactose stream to a predetermined temperature and generates a cooled lactose product stream.

Following treatment in the fluidized bed cooling zone 76, the temperature of the cooled lactose product stream may be less than about 45° C., or about 32° C. to about 20° C. In any case the final product temperature should not be "overcooled" by cooling air of high relative humidity; in which case the water activity of the final product will increase to the point that the product is not shelf-stable.

In some embodiments, the system 10 may not include the optional fluidized cooling bed 76, and can cool the substantially dried lactose stream by any of forced convection, by conduction, by conveying in cool air, by allowing the substantially dried lactose stream to equilibrate with the ambient surroundings, and combinations thereof, or by other suitable cooling methods.

Fed air 78 and 80 can exit the dryer 70 through an exhaust line 82 that can be fed into a baghouse 84 that can collect fine particles 86 that are entrained by the hot air in the exhaust line 82. Alternately, a powder recovery cyclone can be used for recovering fines 86 from the exhaust line 82. The fines 86 can be recycled back to a previous stage of the system 10, such as by feeding the fines into the last crystallizing stage of the crystallization system 16, e.g., into the second mixer 48 in the example system 10 of FIG. 1. Alternately, the fine particles 86 can be collected and packaged separate from the main stream powder 92.

The finishing system 18 can also include a mill 90 configured to grind the solid lactose 72 coming out of the dryer 70 to a free-flowing powder 92. The free-flowing lactose powder 92 can then be transferred to a packaging system 94 where the lactose powder 92 can be packaged for delivery to customers.

In some embodiments, mills described as hammermills can be used to reduce average particle size to the range of 60 to 100 mesh while mills described as fine-grind mills can be used to reduce average particle size to the range of 100 to 320 mesh.

Figure 2:
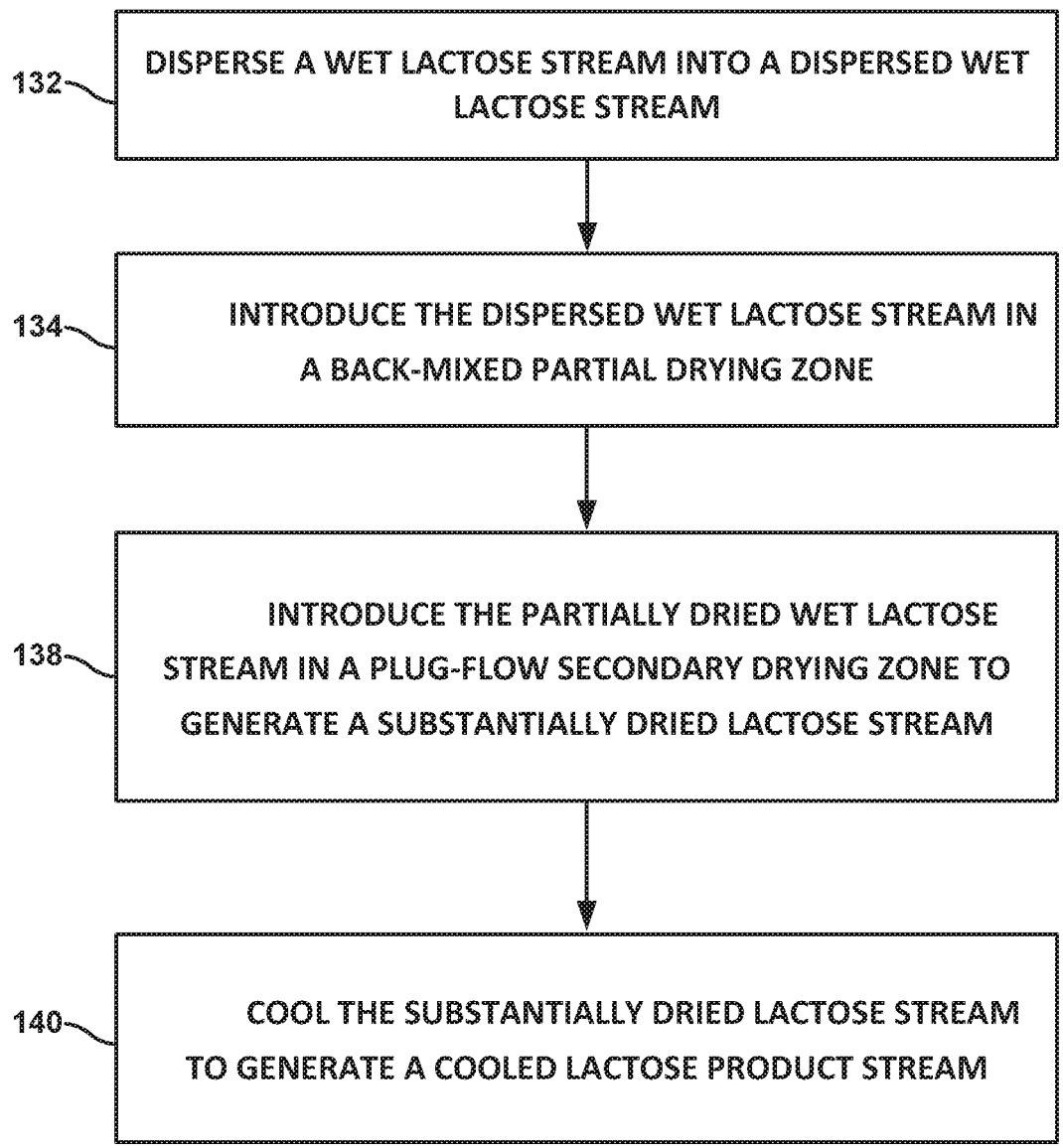
FIG. 2 is a flowchart illustrating an embodiment of a process for drying lactose.

FIG. 2 is a flowchart illustrating an embodiment of a process for drying lactose.

In step 132, a wet lactose stream is introduced into a dispersing apparatus to disperse the lactose and produce into a dispersed wet lactose stream.

In step 134, the dispersed wet lactose stream is introduced into a back-mixed partial drying zone 74A. In step 138, the process further includes introducing the partially dried lactose stream in a plug-flow secondary drying zone 74B to generate a shelf-stable substantially dried lactose stream.

In step 140, the substantially dried lactose stream may be cooled to generate a cooled lactose product stream. For example, the cooling step may include introducing the substantially dried lactose stream into a fluidized cooling bed 76, or may utilize forced convection, circulating air, gradual equilibration with ambient surroundings, or various combinations thereof.

In some embodiments, introducing the wet lactose product stream from one zone to another may include one or more of transporting the product within the static fluidized bed, transporting the product using a screw impeller, transporting the product using a conveyor belt, suspending the product in a flow of air, or any other suitable method for conveying the product stream.

Thus, a wet agglomerated lactose stream may be substantially dried and de-agglomerated, using example systems and techniques of the disclosure, without suffering various disadvantages associated with other drying systems. The following items according to the disclosure are provided as examples.

Item 1: A system comprising: a disperser configured to disperse agglomerated lactose particulates in a wet lactose stream into a dispersed wet lactose stream; a back-mixed partial drying zone configured to at least partially dry the dispersed wet lactose stream by recirculating a partially dried lactose stream with the dispersed wet lactose stream; and a plug-flow secondary drying zone configured to dry the partially dried lactose stream to generate a substantially dried lactose stream.

Item 2: The system of item 1, wherein the lactose stream comprises lactose.

Item 3: The system of item 1 or 2, wherein the lactose stream comprises de-proteinized whey.

Item 4: The system of any one of items 1 to 3, wherein the lactose stream consists essentially of lactose.

Item 5: The system of any one of items 1 to 4, further comprising a static fluid bed dryer, wherein the static fluid bed dryer comprises one or both of the back-mixed partial drying zone and the plug-flow secondary drying zone.

Item 6: The system of any one of items 1 to 5, further comprising a fluidized cooling bed configured to cool the substantially dried lactose stream.

Item 7: The system of any one of items 1 to 6, wherein an inlet temperature in the back-mixed partial drying zone is about 90° C. to about 160° C.

Item 8: The system of any one of items 1 to 7, wherein an outlet temperature of the back-mixed drying zone is about 45° C. to about 90° C.

Item 9: The system of any one of items 1 to 8, wherein the partially dried lactose stream emerging from the back-mixed drying zone has a free moisture content of less than about 5% by weight.

Item 10: The system of any one of items 1 to 9, wherein the temperature of the plug-flow secondary drying zone is about 90° C. to about 120° C.

Item 11: The system of any one of items 1 to 10, wherein the substantially dried lactose stream that emerges from the plug-flow secondary drying zone has a free moisture content of about 0.0% by weight to about 1.0% by weight.

Item 12: A method comprising: dispersing a wet lactose stream into a dispersed wet lactose stream; introducing the dispersed wet lactose stream in a back-mixed partial drying zone, wherein the back-mixed partial drying zone comprises a partially dried lactose stream that recirculates with the dispersed wet lactose stream; and introducing the partially dried lactose stream in a plug-flow secondary drying zone to generate a substantially dried lactose stream.

Item 13: The method of item 12, wherein the lactose stream comprises lactose.

Item 14: The method of item 12 or 13, wherein the lactose stream consists essentially of lactose.

Item 15: The method of any one of items 12 to 14, further comprising cooling the substantially dried lactose stream in a fluidized cooling bed.

Item 16: The method of any one of items 12 to 15, further comprising cooling the substantially dried lactose stream in a fluidized cooling bed.

Item 17: The method of any one of items 12 to 16, wherein an inlet temperature in the back-mixed partial drying zone is about 90° C. to about 160° C.

Item 18: The method of any one of items 12 to 17, wherein an outlet temperature of the back-mixed drying zone is about 45° C. to about 90° C.

Item 19: The method of any one of items 12 to 18, wherein the partially dried lactose stream emerging from the back-mixed drying zone has a free moisture content of less than about 5% by weight.

Item 20: The method of any one of items 12 to 19, wherein the temperature of the plug-flow secondary drying zone is about 90° C. to about 120° C.

Item 21: The method of any one of items 12 to 20, wherein the substantially dried lactose stream that emerges from the plug-flow secondary drying zone has a free moisture content of about 0.0% by weight to about 1.0% by weight.

Item 22: A method comprising: concentrating a wet lactose stream in one or more evaporators to form a concentrated wet lactose stream; crystallizing at least a portion of the lactose in the concentrated wet lactose stream in a crystallization cascade comprising one or more crystallizing stages to form an at least partially crystallized wet lactose stream; and drying the at least partially crystallized wet lactose composition to form a substantially dried lactose product, wherein the drying comprises: dispersing the at least partially crystallized wet lactose stream into a dispersed wet lactose stream; introducing the dispersed wet lactose stream in a back-mixed partial drying zone, wherein the back-mixed partial drying zone comprises a partially dried lactose stream that recirculates with the dispersed wet lactose stream; and introducing the partially dried lactose stream in a plug-flow secondary drying zone to generate a substantially dried lactose stream.

Various examples of the invention have been described. These and other examples are within the scope of the following claims.

The invention claimed is:
1. A system comprising:
a plurality of evaporators connected in series, wherein the evaporators output a concentrated wet lactose stream with a total solids content of about 70 wt % to about 92 wt %;
a crystallization system that inputs the concentrated wet lactose stream and outputs an at least partially crystallized wet lactose stream comprising crystallized wet lactose, wherein the at least partially crystallized wet lactose stream is input into a drying and finishing system, the drying and finishing system comprising:
a disperser that breaks up agglomerated particulates of crystallized wet lactose in the at least partially crystallized wet lactose stream to form a dispersed wet lactose stream;
a back-mixed partial drying zone that at least partially dries the dispersed wet lactose stream by recirculating a partially dried lactose stream with the dispersed wet lactose stream; and
a plug-flow secondary drying zone that dries the partially dried lactose stream to generate a substantially dried lactose stream with a free moisture content of about 0.0% by weight to about 1.0% by weight.

2. The system of claim 1, wherein the wet lactose stream comprises lactose.

3. The system of claim 1, wherein the wet lactose stream comprises de-proteinized whey.

4. The system of claim 1, wherein the wet lactose stream consists essentially of lactose.

5. The system of claim 1, further comprising a static fluid bed dryer, wherein the static fluid bed dryer comprises one or both of the back-mixed partial drying zone and the plug-flow secondary drying zone.

6. The system of claim 1, further comprising a fluidized cooling bed configured to cool the substantially dried lactose stream.

7. The system of claim 1, wherein an inlet temperature in the back-mixed partial drying zone is about 90° C. to about 160° C.

8. The system of claim 1, wherein an outlet temperature of the back-mixed drying zone is about 45° C. to about 90° C.

9. The system of claim 1, wherein the partially dried lactose stream emerging from the back-mixed drying zone has a free moisture content of less than about 5% by weight.

10. The system of claim 1, wherein the temperature of the plug-flow secondary drying zone is about 90° C. to about 120° C.

* * * * *